L. WOLFF, Jr.
DEMOUNTABLE WHEEL RIM HOLDER.
APPLICATION FILED MAY 31, 1910.
978,976.
Patented Dec. 20, 1910.
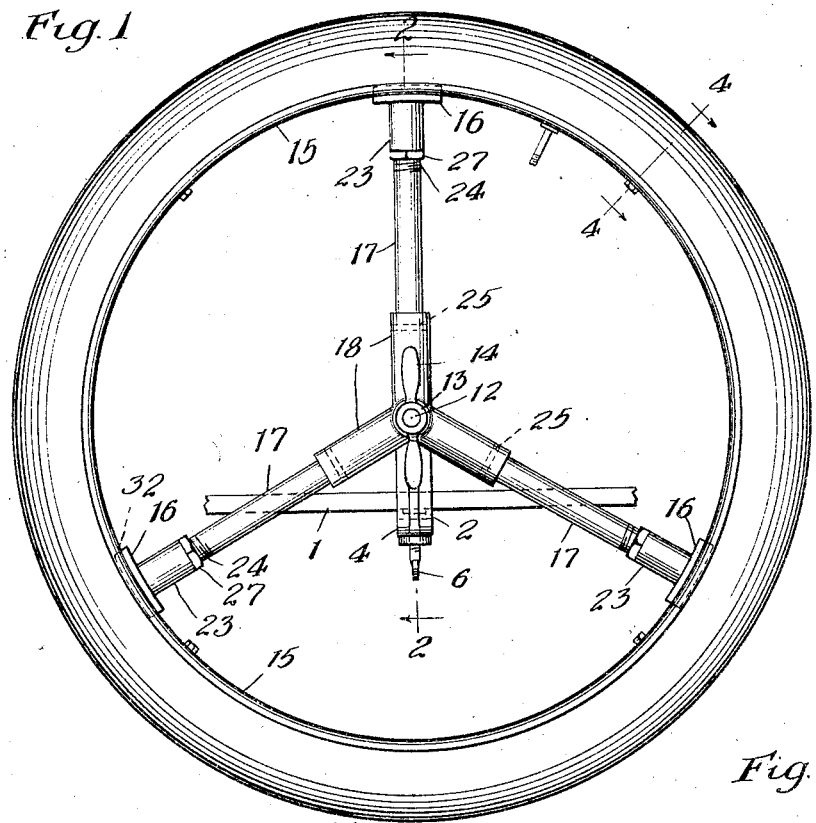
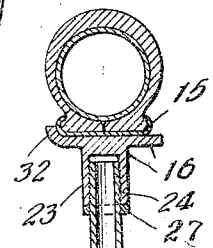
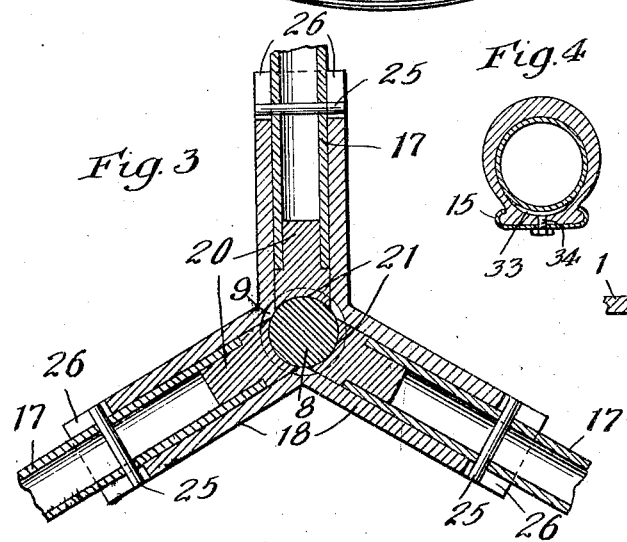
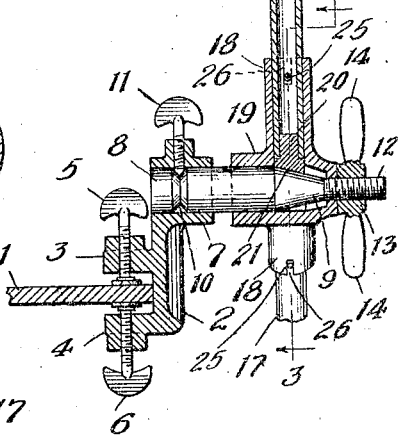
Witnesses:
Wm. Geiger
Inventor:
Louis Wolff Jr.
By Munday, Evarts, Adcock & Clarke.
Attorneys.

UNITED STATES PATENT OFFICE.

LOUIS WOLFF, JR., OF CHICAGO, ILLINOIS.

DEMOUNTABLE-WHEEL-RIM HOLDER.

978,976.  Specification of Letters Patent.  Patented Dec. 20, 1910.

Application filed May 31, 1910. Serial No. 564,100.

*To all whom it may concern:*

Be it known that I, LOUIS WOLFF, Jr., a citizen of the United States, residing in Chicago, in the county of Cook and State of Illinois, have invented a new and useful Improvement in Demountable-Wheel-Rim Holders, of which the following is a specification.

My invention relates to improvements in demountable tire rim holders for automobile or other wheels.

The object of my invention is to provide a detachable or demountable automobile tire rim holder of a simple and efficient construction to facilitate the removing and replacing of the tire from the rim and the inner tube from the tire, which may be conveniently clamped or attached to the running board of the automobile, a fence or other support, which will be of a knockdown construction so that it may be taken apart and packed in small compass when not in use, which will enable the wheel rim and tire to be revolved to any desired position and locked in such position, and which will also serve, if desired, as a carrying device for an extra demountable rim and tire.

My invention consists in the novel construction of parts and devices and in the novel combinations of parts and devices herein shown and described by which this object or result is accomplished, the same being more particularly specified in the claims.

In the accompanying drawing forming a part of this specification, Figure 1 is a front elevation of a demountable tire rim holder embodying my invention, the same being illustrated as removably attached or clamped to the running board of the machine as a suitable support. Fig. 2 is a central, vertical section. Fig. 3 is a detail section on line 3—3 of Fig. 2, and Fig. 4 is a cross section on line 4—4 of Fig. 1.

In the drawing, 1 represents a suitable support to which my demountable tire rim holder may be attached, for example, the running board of an automobile.

My demountable tire rim holder comprises a clamp head 2 having clamp jaws 3, 4, furnished with clamp screws 5, 6 for removably attaching the same to the running board of the machine, a fence, platform or other suitable support, and provided with a central bearing or hub 7 to receive a shaft 8 having a cone or wedge portion 9 and an annular V groove 10 for engaging the set screw 11 by which the shaft 8 is fixed in any position to which it may be turned. The shaft 8 is furnished with screw threads 12 to receive the nut 13 which is provided with handles 14 for turning same.

The demountable tire rim 15 is centrally held by a plurality, preferably three, internal clamps 16 carried by radially sliding or expansible arms 17, mounted in the hollow arms 18 of a central sleeve 19 which is carried by the cone shaped end 9 of the shaft 8, each of the radial arms 17 having a steel plug 20 at its inner end provided with a wedge face 21 for engagement with the cone face 9 of the shaft 8, so that as the sleeve 19 is forced inward on the shaft 8 by the screw wheel or nut 13, the clamps 16 will be expanded or forced radially outward against the interior periphery of the tire rim 15, thus securely clamping and holding the same in position. Each of the radially expansible clamps 16 is preferably furnished with a lip 32 for engagement with one edge of the tire rim, and also with a hollow shank 23 which is internally screw threaded to receive the screw threaded ends 24 of the radial arms 17, so that the clamps 16 may be radially adjusted for holding tires of different diameters. The radial arms 17 for the rim clamps 16 are preferably tubular in form, and the same are prevented from turning in the hollow arms 18 of the sleeve 19 by pins 25 secured to said hollow arms 18 and fitting in longitudinal slots 26 of the hollow arms 17, the longitudinal slots permitting the necessary radially sliding or expanding movement being imparted to the radial arms 17 by the cone or wedge 9 of the shaft 8 under action of the clamp nut 13. The radial arms 17 are preferably furnished with jam nuts 27 to prevent the clamps 16 turning on the radial arms after being once adjusted to position.

In operation, the holder is first attached to the running board or other suitable support by the clamp screws on the clamp head 2, and then the radial clamp 16 being sufficiently collapsed to admit the tire rim onto the same, the tire rim is placed thereon and then by turning the handle nut 13, the clamps are radially expanded, thus firmly and securely clamping the wheel rim and holding it in position, so that any suitable operations may be performed, such as the removal of the tire from the rim or the removal and replacement of the inner tube. By simply loosening the set screw 11, the tire rim holder with the wheel rim and tire thereon may be turned into any position desired for proper manipulation. To knockdown, take apart or collapse the holder into compact compass, all that is necessary is to loosen the set screw 11, and then the clamp head can be removed from the shaft 8, and by removing the pins 25 the radial arms 17 with the clamp 16 thereon may be removed from the central sleeve 19, and the central sleeve 19 may, if desired, be removed from the shaft 8 by simply running off the hand wheel or nut 13, and if desired, the clamp 16 can be readily unscrewed from the radial arms 17. The holder also may be used as a carrier for an extra wheel rim and tire by simply attaching the holder through its clamp head and clamp screws with the running board or other suitable bracket or supporting device on the automobile.

My tire rim holder is of special advantage and convenience in the manipulation of tire rims used with clencher tires, and having lugs 33 at intervals for holding the tire spread into the clenchers of the rim as the radially expansible rim clamps, and the radial arms for operating the same may be adjusted or placed between the tire lugs, thus enabling the radial stems 34 of the lugs to be readily pushed in and out as required for the removal of the tire from the clencher rim.

I claim:—

1. A demountable tire rim holder for automobile wheels, comprising in combination a clamp head having clamp jaws and a clamp screw and a hub to receive a shaft, a shaft fitting in said hub and provided with a cone or wedging portion, a central sleeve fitting on said shaft and having a plurality of hollow radial arms, a plurality of radially expansible tire rim clamps having radial arms slidably engaging the radial arms of said sleeve, substantially as specified.

2. A demountable tire rim holder for automobile wheels, comprising in combination a clamp head having clamp jaws and a clamp screw and a hub to receive a shaft, a shaft fitting in said hub and provided with a cone or wedging portion, a central sleeve fitting on said shaft and having a plurality of hollow radial arms, a plurality of radially expansible tire rim clamps having radial arms slidably engaging the radial arms of said sleeve, the radial arms of said clamps being adjustably connected thereto, substantially as specified.

3. A demountable tire rim holder for automobile wheels, comprising in combination a clamp head having clamp jaws and a clamp screw and a hub to receive a shaft, a shaft fitting in said hub and provided with a cone or wedging portion, a central sleeve fitting on said shaft and having a plurality of hollow radial arms, a plurality of radially expansible tire rim clamps having radial arms slidably engaging the radial arms of said sleeve, the radial arms of said clamps being adjustably connected thereto, and having at their inner ends plugs with inclined faces engaging the conical or wedging portion of said shaft, substantially as specified.

4. A demountable tire rim holder for automobile wheels, comprising in combination a clamp head having clamp jaws and a clamp screw and a hub to receive a shaft, a shaft fitting in said hub and provided with a cone or wedging portion, a central sleeve fitting on said shaft and having a plurality of hollow radial arms, a plurality of radially expansible tire rim clamps having radial arms slidably engaging the radial arms of said sleeve, the radial arms of said clamps being adjustably connected thereto, and having at their inner ends plugs with inclined faces engaging the conical or wedging portion of said shaft, and interengaging devices on the radial arms of said sleeve and the radial arms of said clamps to prevent the clamp arms from turning in the arms of the sleeve, substantially as specified.

5. A demountable tire rim holder comprising a clamp head furnished with means for removably attaching it to a support and a plurality of radially expansible clamps adapted to engage the inner periphery of the tire rim and hold it in position, substantially as specified.

6. A demountable tire rim holder comprising a clamp head furnished with means for removably attaching it to a support and a plurality of radially expansible clamps adapted to engage the inner periphery of the tire rim and hold it in position, and means for radially expanding said clamps, substantially as specified.

7. A demountable tire rim holder comprising a clamp head furnished with means for removably attaching it to a support and a plurality of radially expansible clamps adapted to engage the inner periphery of the tire rim and hold it in position, and means for radially expanding said clamps, comprising a wedge, a central sleeve and arms having plugs engaging said wedge, substantially as specified.

8. A demountable tire rim holder for automobile wheels, comprising in combination a clamp head having clamp jaws and a clamp screw and a hub to receive a shaft, a shaft fitting in said hub and provided with a cone or wedging portion, a central sleeve fitting on said shaft and having a plurality of hollow radial arms, a plurality of radially expansible tire rim clamps having radial arms slidably engaging the radial arms of said sleeve, said shaft being rotatable in said clamp head and said clamp head having a set screw for locking the shaft in any position to which it may be turned, substantially as specified.

LOUIS WOLFF.

Witnesses:
H. M. MUNDAY,
E. ABRAMS.